United States Patent
Kang (10) Patent No.: US 8,896,934 B2
(45) Date of Patent: Nov. 25, 2014

(54) ZOOM LENS BARREL ASSEMBLY AND CAPTURING APPARATUS INCLUDING THE SAME

(71) Applicant: Samsung Electronics Co., Ltd., Suwon-si (KR)

(72) Inventor: Yoon-seok Kang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/904,249

(22) Filed: May 29, 2013

(65) Prior Publication Data

US 2014/0098427 A1    Apr. 10, 2014

(30) Foreign Application Priority Data

Oct. 5, 2012    (KR) .................. 10-2012-0110863

(51) Int. Cl.
| | | |
|---|---|---|
| *G02B 15/14* | (2006.01) | |
| *G02B 27/10* | (2006.01) | |
| *G02B 7/04* | (2006.01) | |

(52) U.S. Cl.
CPC . *G02B 7/04* (2013.01); *G02B 27/10* (2013.01)
USPC ............................ 359/701; 359/694; 359/823

(58) Field of Classification Search
USPC ........ 359/823–825, 694–704; 396/72–79, 85, 396/348–350
See application file for complete search history.

(56) References Cited

U.S. PATENT DOCUMENTS

| | | | |
|---|---|---|---|
| 6,965,733 B1 | 11/2005 | Nomura | |
| 7,835,085 B2 | 11/2010 | Yamazaki | |
| 8,456,756 B2 * | 6/2013 | Lee et al. | 359/701 |
| 8,520,319 B2 * | 8/2013 | Kim et al. | 359/701 |
| 8,670,188 B2 * | 3/2014 | Kim et al. | 359/701 |
| 2006/0007565 A1 | 1/2006 | Eto | |
| 2011/0032626 A1 | 2/2011 | Tsuji | |
| 2011/0038058 A1 | 2/2011 | Fukai | |
| 2012/0044579 A1 | 2/2012 | Tsuji et al. | |

OTHER PUBLICATIONS

PCT Search Report and Written Opinion established for PCT/KR2013/003786 (Aug. 24, 2013).
Extended European Search Report issued for EP 13177500.9 (Apr. 3, 2014).

* cited by examiner

*Primary Examiner* — Loha Ben
(74) *Attorney, Agent, or Firm* — Drinker Biddle & Reath LLP (57) ABSTRACT

A zoom lens barrel assembly includes: a first zoom ring that supports a first lens group; a first guide ring, of which the first zoom ring is disposed on an inner side, is cam-connected to the first zoom ring to cause the first lens group to move linearly along an optical axis direction by rotation; a second zoom ring that supports a second lens group and is cam-connected to the first guide ring to move linearly along the optical axis direction; a second guide ring cam-connected to the first guide ring and configured to move linearly along the optical axis direction to rotate the first guide ring; a second cylinder configured to move linearly along the optical axis direction together with the second zoom ring while being rotated; and an external cylinder including a third lens group and is cam-connected to the second cylinder to cause the second cylinder to rotate.

15 Claims, 12 Drawing Sheets

ZOOM LENS BARREL ASSEMBLY AND CAPTURING APPARATUS INCLUDING THE SAME

CROSS-REFERENCE TO RELATED APPLICATION

This application claims priority from Korean Patent Application No. 10-2012-0110863, filed on Oct. 5, 2012, in the Korean Intellectual Property Office, the disclosure of which is incorporated herein by reference in its entirety.

BACKGROUND

1. Field

Apparatuses and methods consistent with exemplary embodiments relate to a zoom lens barrel assembly, and more particularly, to a zoom lens barrel assembly capable of reducing a full storage length of a barrel while satisfying a stroke length of a zoom ring, reducing an operating load, and ensuring operating reliability during a zoom operation of the barrel.

2. Description of the Related Art

In general, a zoom lens barrel assembly employs a structure in which a cam projection of a zoom ring is deviated from a cam curve of a guide ring, and the zoom ring is stored to reduce a full storage length of a barrel.

In this case, as the cam projection is deviated from the cam curve, a marginal gap may form between the parts. To prevent the deviation of the cam projection, a predetermined guide structure is formed to protrude from an outer side of the guide ring to support the zoom ring, to simultaneously guide one surface of the cam projection of the zoom ring, and to store and fix the zoom ring. Thus, when the guide ring is rotated and an inclined plane of the projection meets with an inclined plane of the zoom ring during a zoom operation of the barrel, the zoom ring is pushed to enter into a main orbit of the cam curve formed in an outer circumference of the guide ring so that the zoom ring can operate.

The above-described barrel assembly in the related art has a structure in which the guide structure, which protrudes from the outer side of the guide ring, comes in contact with a supporting plane protruding from a bottom end of the zoom ring and an opposite plane. The guide structure is supported and fixed to the cam projection and a bottom groove portion formed in a bottom end of the guide ring. Since the two supporting portions (two supporting planes) are different from each other, jamming and loosening occur due to part assembly tolerance and machining deviation. Since one side surface of the cam projection and the guide ring have to be assembled together, a position of the cam projection is difficult to extend further downward. Therefore, it is difficult to expand the stroke length of the zoom ring, which limits the depth of a storage position of the zoom ring.

During a zoom operation of the barrel assembly, large load is instantaneously applied at a point where an inclined plane of the guide structure on the outer side of the guide ring meets with an inclined plane formed on the bottom end of the zoom ring, causing simultaneous jamming. In this case, since the two supporting portions are respectively formed in different members, it is difficult to machine the parts to modify the inclined plane of the zoom ring and still have an optimal operation position, and it is difficult to ensure operation reliability due to serious wear and tear of the parts of the inclined plane caused by repeated endurance work.

SUMMARY

One or more exemplary embodiments may overcome the above disadvantages and other disadvantages not described above. However, it is understood that one or more exemplary embodiment is not required to overcome the disadvantages described above, and may not overcome any of the problems described above.

One or more exemplary embodiments provides a zoom lens barrel assembly capable of reducing a full storage length of a barrel while satisfying a stroke length of a zoom ring, reducing an operating load, and ensuring operating reliability during a zoom operation of the barrel.

According to an exemplary embodiment, a zoom lens barrel assembly is provided. The zoom lens barrel assembly may include: a first zoom ring configured to support a first lens group; a first guide ring, on an outer side of which the first zoom ring is disposed, cam-connected to the first zoom ring to cause the first lens group to move linearly along an optical axis direction by rotation; a second zoom ring configured to support a second lens group, and cam-connected to the first guide ring to move linearly along the optical axis direction; a second guide ring cam-connected to the first guide ring and configured to move linearly along the optical axis direction to rotate the first guide ring; a cylinder configured to move linearly along the optical axis direction together with the second zoom ring while being rotated; and an external cylinder including a third lens group, where the third lens group is positioned on an inner side of the external cylinder and on an optical axis together with the first and second lens groups, and the external cylinder is cam-connected to the cylinder to cause the cylinder to rotate. An auxiliary cam projection of the first guide ring coupled to an auxiliary cam groove of the first zoom ring may be inserted into the auxiliary cam groove of the first zoom ring, before a cam projection of the first zoom ring coupled to a cam groove of the first guide ring is deviated from the cam groove.

The auxiliary cam groove may include: an inclined portion obliquely formed from one side end of the first zoom ring toward an other side end of the first zoom ring, and a straight portion formed along a circumferential direction of the first zoom ring from an end of the inclined portion.

The auxiliary cam projection of the first guide ring may be positioned on the inclined portion of the auxiliary cam groove when the cam projection of the first zoom ring is in a position adjacent to an end of the cam groove, before the cam projection of the first zoom ring is deviated from the cam groove.

The auxiliary cam projection of the first guide ring may be positioned on the inclined portion or the straight portion of the auxiliary cam groove, when the cam projection of the first zoom ring has deviated from the cam groove and is positioned to be in contact with one side end of the first guide ring.

The auxiliary cam projection of the first guide ring may be positioned on the inclined portion or the straight portion of the auxiliary cam groove, when the cam projection of the first zoom ring has deviated from the cam groove and is positioned to be spaced from one side end of the first guide ring.

The inclined portion may have a length greater than a length the straight portion.

The cam projection of the first zoom ring may set a marginal gap between the cam projection and the cam groove of the first guide ring according to a projecting length of the cam projection.

The auxiliary cam projection of the first guide ring may set a marginal gap between the auxiliary cam projection and the auxiliary cam groove of the first zoom ring according to a projecting length of the auxiliary cam projection.

The cam projection of the first zoom ring may be formed on an inner circumferential surface of an extending portion, and the extending portion is formed on one side end of the first zoom ring to protrude along the optical axis direction.

According to another exemplary embodiment, a zoom lens barrel assembly is provided. The zoom lens barrel assembly may include: a first zoom ring configured to support a first lens group; a first guide ring, on an outer side of which the first zoom ring is disposed, cam-connected to the first zoom ring to cause the first lens group to move linearly along an optical axis direction by rotation; a second zoom ring configured to support a second lens group, the second zoom ring disposed on an inner side of the first zoom ring and scam-connected to the first guide ring to move linearly along the optical axis direction; a second guide ring, on an inner side of which the first guide ring is disposed, cam-connected to the first guide ring and is configured to move linearly along the optical axis direction to rotate the first guide ring; a cylinder, on an inner side of which the second zoom ring is disposed, configured to move linearly along the optical axis direction together with the second zoom ring while being rotated; and an external cylinder, on an inner side of which the cylinder is rotatably disposed. The assembly further includes a third lens group disposed on an optical axis together with the first and second lens groups. A cam projection protruding on an inner side of the first zoom ring is slidably coupled to a cam groove formed on an outer side of the first guide ring, and an auxiliary cam projection on an outer side of the first guide ring is slidably coupled to an auxiliary cam groove formed on an inner side of the first zoom ring.

According to another exemplary embodiment, an image capturing apparatus is provided. The image capturing apparatus may include: a camera body; and the above-described zoom lens barrel assembly installed on the camera body.

Additional aspects and advantages of the exemplary embodiments will be set forth in the detailed description, will become apparent from the detailed description, or may be learned by practicing the exemplary embodiments.

BRIEF DESCRIPTION OF THE DRAWINGS

The above and/or other aspects will become more apparent by describing in detail exemplary embodiments, with reference to the accompanying drawings, in which.

DETAILED DESCRIPTION OF THE EXEMPLARY EMBODIMENTS

Hereinafter, exemplary embodiments will be described in more detail with reference to the accompanying drawings.

In the following description, same reference numerals are used for the same elements when they are depicted in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, functions or elements known in the related art are not described in detail since they would obscure the exemplary embodiments with unnecessary detail.

Figure 1:
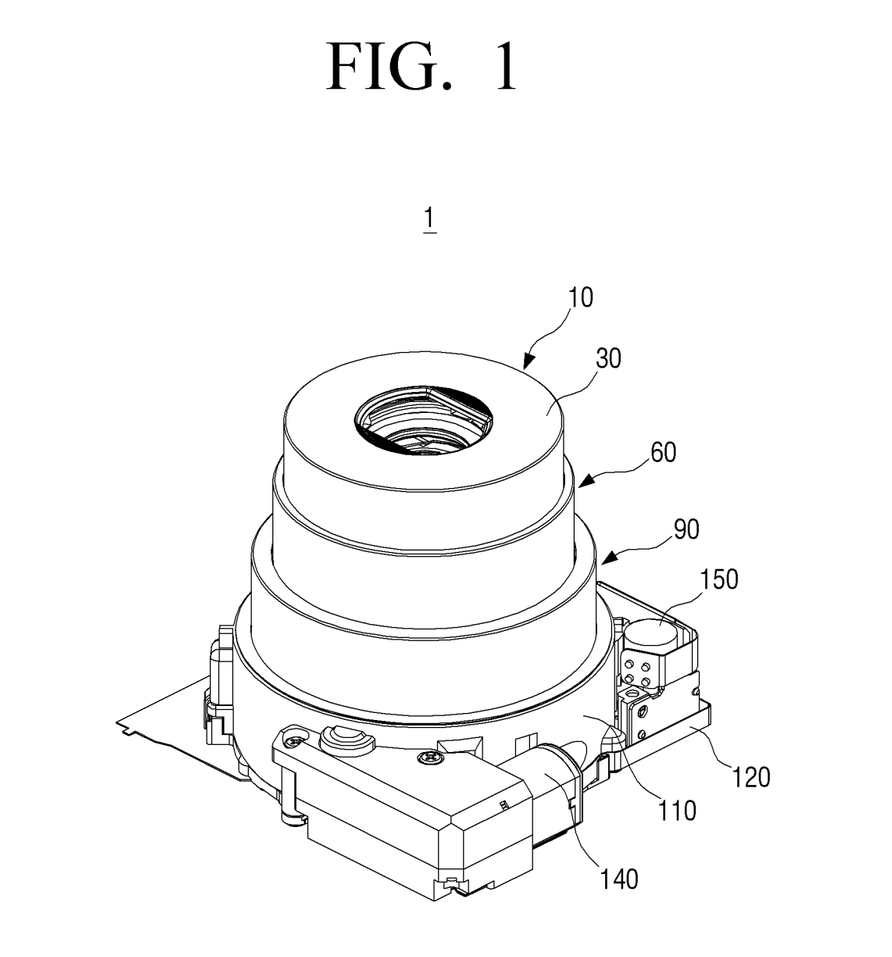
FIG. 1 is a combined perspective view illustrating a zoom lens barrel assembly, according to an exemplary embodiment.

FIG. 1 is a combined perspective view illustrating a zoom lens barrel assembly 1, according to an exemplary embodiment.

Referring to FIG. 1, the zoom lens barrel assembly 1 according to an exemplary embodiment may be expanded to three stages to perform an optical zoom function of a preset multiple optical zoom functions. In this case, a second cylinder 90 protrudes from an external cylinder 110, a first cylinder 60 protrudes from the second cylinder 90, and a first zoom ring 10 protrudes from the first cylinder 60.

Figure 2:
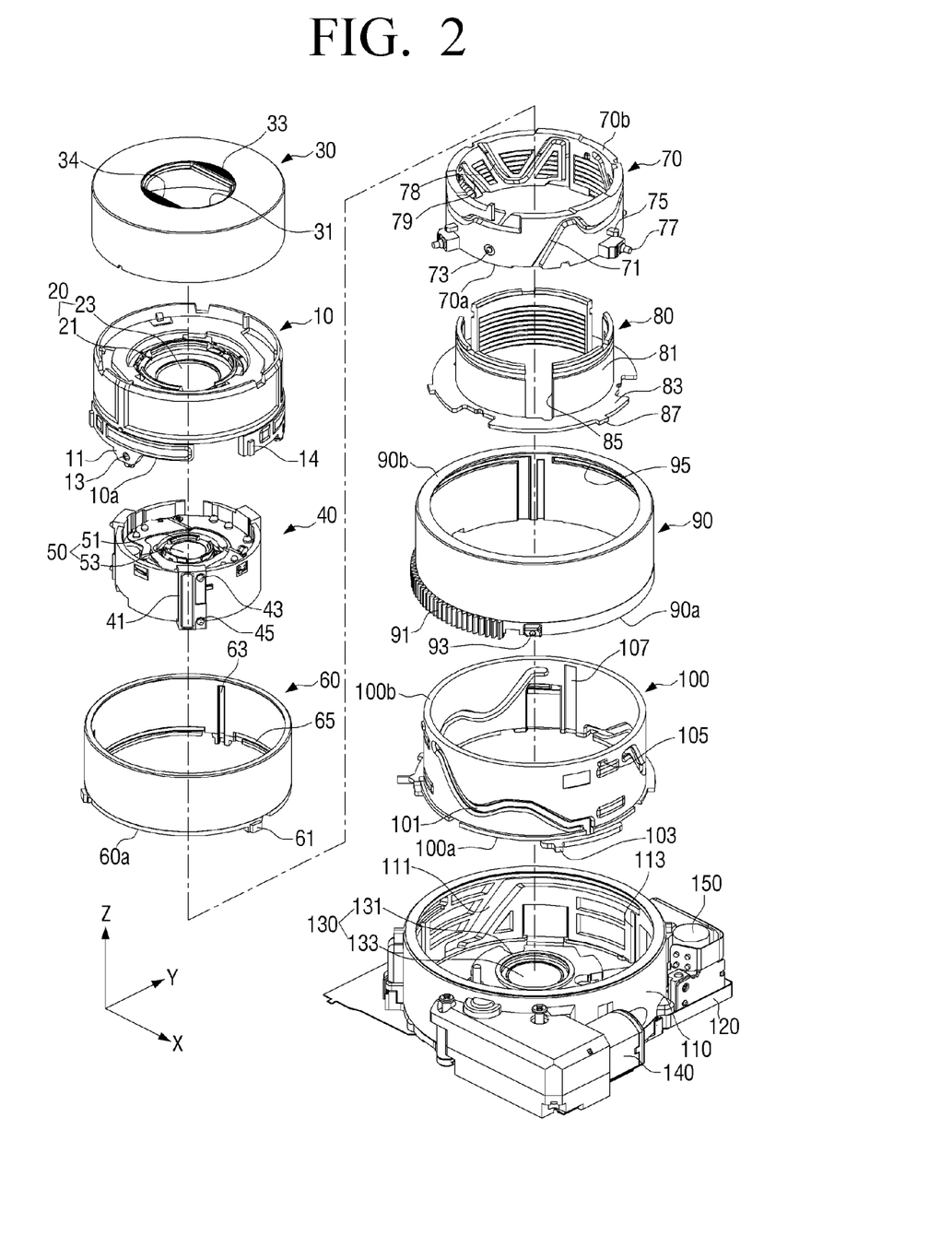
FIG. 2 is an exploded perspective view illustrating a zoom lens barrel assembly, according to an exemplary embodiment.

FIG. 2 is an exploded perspective illustrating the zoom lens barrel assembly 1, according to an exemplary embodiment.

Referring to FIG. 2, the first zoom ring 10 causes a first lens unit 20 to move forward and backward along an optical axis direction (a Z-axis direction). The first lens unit 20 includes a first lens supporter 21 coupled to the first zoom ring 10 and a first lens group 23 supported by the first lens supporter 21. In this case, the first lens group 23 is disposed so that the center of the first lens group 23 coincides with an optical axis. Further, the first zoom ring 10 is coupled to a cap unit 30 in the front thereof. A light-through hole 31 is formed in the cap unit 30 to radiate light to the first lens group 23, and a pair of lens protection shutters 33 and 34 is disposed on an inner side of the front of the cap unit 30.

Further, an extending portion 11 is formed to protrude from one side end 10a of the first zoom ring 10, and a first cam projection 13 is formed in the extending portion 11 to protrude toward an inner side of the first zoom ring 10. In the exemplary embodiment, at least three of the extending portions 11 and at least three of the first cam projection 13 may be formed. The first cam projection 13 is slidably and movably coupled to a first cam groove 71 formed along an outer circumferential surface of a first guide ring 70.

A first guide projection 14 is formed in an outer circumferential surface of the first zoom ring 10 and is adjacent to the one side end 10a. The first guide projection 14 is slidably and movably coupled to a first straight guide groove 63, and the first straight guide groove 63 is formed in an inner circumferential surface of the first cylinder 60 parallel to the optical axis direction. As the first guide projection 14 is guided by the first straight guide groove 63, the first zoom ring 10 moves linearly forward and backward along the optical axis direction when the first guide ring 70 is rotated in a clockwise direction and a counterclockwise direction.

Figure 4:
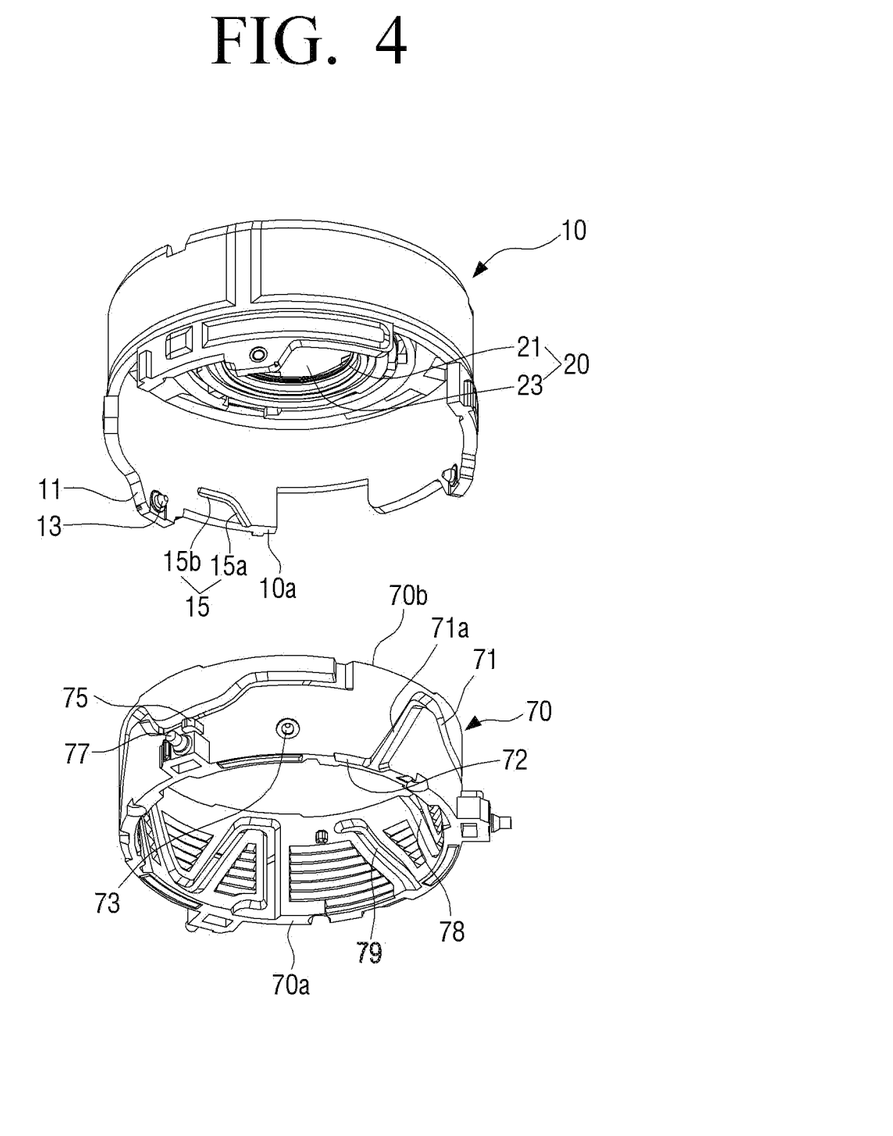
FIG. 4 is a perspective view illustrating a first zoom ring and a first guide ring illustrated in FIG. 2.

Further, an auxiliary cam groove (see 15 of FIG. 4) is formed along the inner circumferential surface of the first zoom ring 10. The auxiliary cam groove 15 includes an inclined portion 15a obliquely formed from the one side end 10a of the first zoom ring 10 along the inner circumferential surface thereof, and a straight portion 15b formed from an end of the inclined portion 15a along a circumferential direction thereof. An auxiliary cam projection 73 of the first guide ring 70, which is rotatably disposed on the inner side of the first zoom ring 10, is slidably and movably coupled to the auxiliary cam groove 15.

A second zoom ring 40 causes a second lens unit 50 to move forward and backward between the first zoom ring 10 and the external cylinder 110 along the optical axis direction. The second lens unit 50 includes a second lens supporter 51 coupled to the second zoom ring 40 and a second lens group 53 supported by the second lens supporter 51. In this case, the second lens group 53 may be disposed so that the center of the second lens group 53 coincides with the optical axis.

Further, a guide portion 41 having a substantially rectangular parallelepiped shape is formed in an outer circumferential surface of the second zoom ring 40, and the first guide portion 41 protrudes parallel to the optical axis direction. The first guide portion 41 is slidably and movably inserted into a straight guide hole 85 of a guide member 80, and the guide member 80 is inserted into an inner side of the first guide ring 70. A second cam projection 43 and a third cam projection 45 are formed on an outer surface of the guide portion 41 to be vertically spaced from each other. The second cam projection 43 and the third cam projection 45 are slidably and movably coupled to a second cam groove 78 and a third cam groove 79 formed on the inner side of the first guide ring 70, respectively. Therefore, the second zoom ring 40 moves linearly forward and backward along the optical axis direction according to the rotation of the first guide ring 70 in the clockwise direction and the counterclockwise direction.

The first cylinder 60 surrounds the first zoom ring 10 and is disposed on the inner side of the second cylinder 90. A second guide projection 61 that protrudes outwards is formed on one side end 60a of the first cylinder 60, and the second guide projection 61 is slidably and movably coupled to a third straight guide groove 107 formed in an inner circumferential surface of a second guide ring 100 parallel to the optical axis direction. Therefore, the first cylinder 60 is guided by the second guide ring 100 to moves linearly along the optical axis direction.

Further, the first straight guide groove 63 is formed in the inner side of the first cylinder 60 parallel to the optical axis direction, and the first guide projection 14 of the first zoom ring 10 is slidably and movably coupled to the first straight guide groove 63. A first rotation guide groove 65 is formed in the inner circumferential surface of the first cylinder 60 adjacent to the one side end 60a along a circumferential direction thereof. A first locking projection 75 of the first guide ring 70 is slidably and movably coupled to the first rotation guide groove 65. Therefore, the first guide ring 70 is rotatably disposed on the inner side of the first cylinder 60.

The first cylinder 60 is disposed on an outer side of the first guide ring 70, and the guide member 80 is disposed on the inner side of the first guide ring 70. The first guide ring 70 causes the first cylinder 60 and the guide member 80 to move forward and backward along the optical axis direction through a rotation operation in the clockwise and counterclockwise directions.

The first cam groove 71, to which the first cam projection 13 of the first zoom ring 10 is slidably coupled, is formed in the first guide ring 70 to move the first zoom ring 10 along the optical axis direction through the rotation operation. In this case, the first cam groove 71 is obliquely formed from one side end 70a of the first guide ring 70 toward the other side end 70b thereof, is obliquely formed downwards from an end of an inclined portion, is formed along a circumferential direction by a constant interval, and is obliquely formed toward the other side end 70b thereof again. Therefore, as the first zoom ring 10 is guided by the first cam groove 71, the first zoom ring 10 can move forward and backward along the optical axis direction and maintain a position thereof at a predetermined position.

The auxiliary cam projection 73 is formed on an outer circumferential surface of the first guide ring 70. Since the auxiliary cam projection 73 is inserted into the auxiliary cam groove 15 of the first zoom ring 10 before the first cam projection 13 of the first zoom ring 10 has completely deviated from the first cam groove 71, when the first zoom ring 10 is moved in a reverse direction and is stored in the external cylinder 110, the first zoom ring 10 may be stably guided by the first guide ring 70 (see FIG. 6). The interlocking operation between the first zoom ring 10 and the first guide ring 70 will be described in detail with reference to the drawings.

Further, the first locking projection 75 and a fourth cam projection 77 are formed on the outer circumferential surface of the first guide ring 70, respectively. In this case, the first locking projection 75 is slidably and movably coupled to the first rotation guide groove 65 of the first cylinder 60, and the fourth cam projection 77 is slidably inserted into a cam guide hole 101 of the second guide ring 100.

The second cam groove 78, to which the second cam projection 43 of the second zoom ring 40 is slidably and movably coupled, is also formed in the inner circumferential surface of the first guide ring 70. The second cam groove 78 is formed straightly along the optical axis direction from one side end 70a of the first guide ring 70 toward the other side end 70b thereof. The second cam groove 78 is obliquely formed toward the one side end 70a, and is obliquely formed toward the other side end 70b again. As the second cam projection 43 of the second zoom ring 40 moves along the second cam groove 78, the second zoom ring 40 moves forward and backward along the optical axis direction. Further, the third cam groove 79, to which the third cam projection 45 of the second zoom ring 40 is slidably coupled, is formed in the inner circumferential surface of the first guide ring 70 and is obliquely formed from the one side end 70a of the first guide ring 70 toward the other side end 70b thereof.

The guide member 80 includes a cylinder portion 81 inserted into the inner side of the first guide ring 70 and a flange portion 83 formed on and extends from a bottom end of the cylinder portion 81. The straight guide hole 85, into which the guide portion 41 of the second zoom ring 40 is slidably and movably inserted, is formed in the cylinder portion 81. The flange portion 83 is formed to protrude in an outward radial direction of the cylinder portion 81. The third guide projection 87, which is slidably and movably coupled to the third straight guide groove 107 of the second guide ring 100, is formed to protrude from the flange portion 83.

The second cylinder 90 is rotatably disposed on the external cylinder 110, and a gear 91 having a predetermined length is formed along an outer circumference of one side end 90a. The gear 91 is engagably coupled to a spur gear (not shown) of a driver 140. When the driver 140 is driven through the gear connection structure, the second cylinder 90 is rotated. The fifth cam projection 93, which is slidably coupled to the external cylinder 110 along a fourth cam groove 111 of the external cylinder 110, is formed on an outer circumferential surface of the one side end 90a of the second cylinder 90. Further, the second rotation guide groove 95 is formed in the inner circumferential surface of the second cylinder 90 adjacent to the other side end 90b in a circumferential direction. A second locking projection 105 of the second guide ring 100 is slidably and movably coupled to the second rotation guide groove 95.

The second guide ring 100 is rotatably disposed on the inner side of the second cylinder 90. Together with the second cylinder 90, the second guide ring 100 moves forward and backward along the optical axis direction and along the external cylinder 110. The cam guide hole 101, into which the fourth cam projection 77 of the first guide ring 70 is slidably inserted, is formed in the second guide ring 100 to guide the first guide ring 70. The cam guide hole 101 forms a predetermined cam curve, which is inclined from the one side end 100a of the second guide ring 100 toward the other side end 100b thereof and bends in multiple stages.

The fourth guide projection 103 is formed on an outer circumferential surface of the second guide ring 100 and adjacent to the one side end 100a thereof, and the second locking projection 105 is formed in the outer circumferential surface of the second guide ring 100 and adjacent to the other side end 100b. Further, the third straight guide groove 107 is formed in the inner circumferential surface of the second guide ring 100 from the one side end 100a to the other side end 100b along the optical axis direction. The third guide projection 87 of the guide member 80 is slidably and movably coupled to the third straight guide groove 107.

The second guide ring 100 does not rotate but moves linearly along the external cylinder 110. The second cylinder 90 is rotated in a manner in which the second guide ring 100 is inserted into the inner side of the second cylinder 90. Further, the above-described parts are interlocked with each other according to the rotation of the second cylinder 90.

The second cylinder 90 is rotatably disposed on the inner side of the external cylinder 110. The fourth cam groove 111, which is obliquely formed along the inner circumferential surface of the external cylinder 110, and a fourth straight guide groove 113, which is formed parallel to the optical axis direction, are formed in the external cylinder 110. The fifth cam projection 93 of the second cylinder 90 is slidably and movably coupled to the fourth cam groove 111. The fourth guide projection 103 of the second guide ring 100 is slidably and movably coupled to the fourth straight guide groove 113.

A third lens unit 130, which is disposed in the external cylinder 110, is mounted on a base 120. In this case, the third lens unit 130 includes a third lens supporter 131 supported by the base 120 and a third lens group 133 coupled to the third lens supporter 131. The third lens group 133 is disposed so that the center of the third lens group 133 coincides with the optical axis. Together with the above-described first lens group 23 and second lens group 53, the third lens group 133 is disposed in a position corresponding to an optical device 160 (see FIG. 3), which is disposed on the base 120. The optical device 160 converts image light passing through the first to third lens groups 23, 53, and 133 into an electrical signal.

The driver 140, which is configured to drive the second cylinder 90, and a focus driver 150, which is configured to generate a driving force for executing a focus adjustment function, are disposed on the base 120 outside the external cylinder 110.

Figure 3:
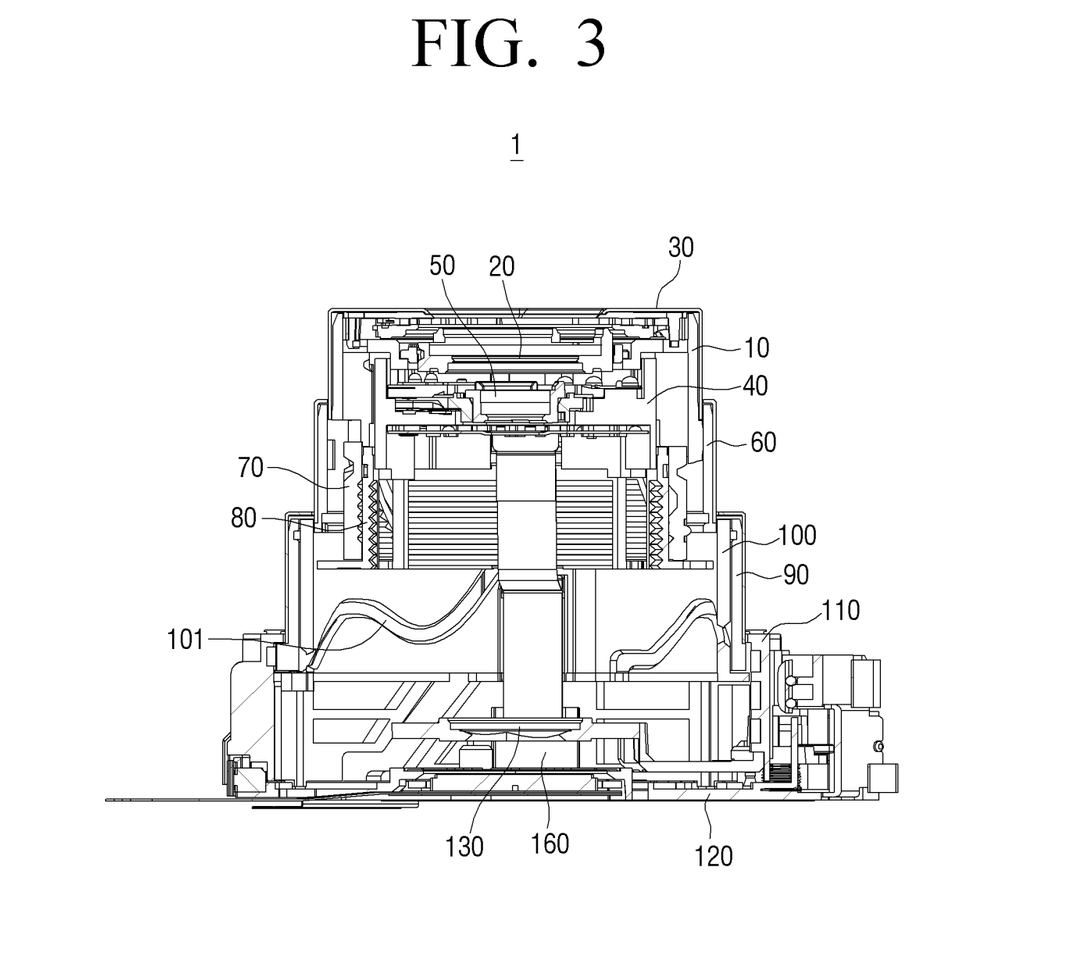
FIG. 3 is a cross-sectional view illustrating the zoom lens barrel assembly of FIG. 1.

FIG. 3 illustrates a cross-section of the zoom lens barrel assembly 1 having the above-described configuration, according to the exemplary embodiment. Referring to FIG. 3, the second cylinder 90 and the second guide ring 100 are movably disposed on the inner side of the external cylinder 110 along the optical axis direction. The first cylinder 60, the first guide ring 70, and the guide member 80 are movably disposed on the inner side of the second cylinder 90 along the optical axis direction. The first zoom ring 10 is movably disposed on the inner side of the first cylinder 60 along the optical axis direction. Further, the second zoom ring 40 is supported by the guide member 80 and is disposed to move between the first zoom ring 10 and the external cylinder 110 along the optical axis direction.

In the zoom lens barrel assembly 1 having the above-described configuration, the second cylinder 90 moves along the optical axis direction while the second cylinder 90 is driven by the drive 140 to rotate with respect to the external cylinder 110. While the second cylinder 90 is rotates, the second guide ring 100 does not rotate but moves linearly along the optical axis direction as the fourth guide projection 103 is coupled to the fourth straight guide groove 113 of the external cylinder 110.

A forward driving force of the second guide ring 100 is transferred to the fourth cam projection 77 of the first guide ring 70. As the fourth cam projection 77 moves along the cam guide hole 101 of the second guide ring 100, while the first guide ring 70 is rotated with respect to the second guide ring 100, the first guide ring 70 moves linearly along the optical axis direction. The first cylinder 60 moves linearly along the optical direction with the first guide ring 70 as the second guide projection 61 is coupled to the third straight guide groove 107 of the second guide ring 100.

Further, a rotation force of the first guide ring 70 is transferred to the first cam projection 13 of the first zoom ring 10. At this time, as the cam projection 13 is coupled to the first guide groove 71 of the first guide ring 70 and the first guide projection 14 is coupled to the first straight guide groove 63 of the first cylinder 60, the first zoom ring 10 moves linearly along the first cylinder 60 and along the optical axis direction. Further, the rotation force of the first guide ring 70 is transferred to the second cam projection 43 and the third cam projection 45 of the second zoom ring 40. At this time, as the guide portion 41 of the second zoom ring 40 is coupled to the straight guide hole 85 of the guide member 80, the second zoom ring 40 moves linearly along the optical axis direction without rotation. In this case, since relative positions of the first lens unit 20 and the second lens unit 40 are changed as the first zoom ring 10 and the second zoom ring 40 move, when the first guide ring 70 is rotated, the zoom lens barrel assembly 1 according to the exemplary embodiment may be adjusted to a telescopic state (see FIG. 3) or a wide angle state, in which the second lens unit 40 is moved or repositioned to be adjacent to the third lens unit 130.

Hereinafter, an operational relationship between the first zoom ring 10 and the first guide ring 70 will be described with reference to FIGS. 5 to 8. FIGS. 5 to 8 are schematic diagrams sequentially illustrating positions of the first cam projection 13 of the first zoom ring 10 and the auxiliary cam projection 73 of the first guide ring 70 when the first zoom ring 10 is moved backward by the first guide ring 70.

Figure 5:
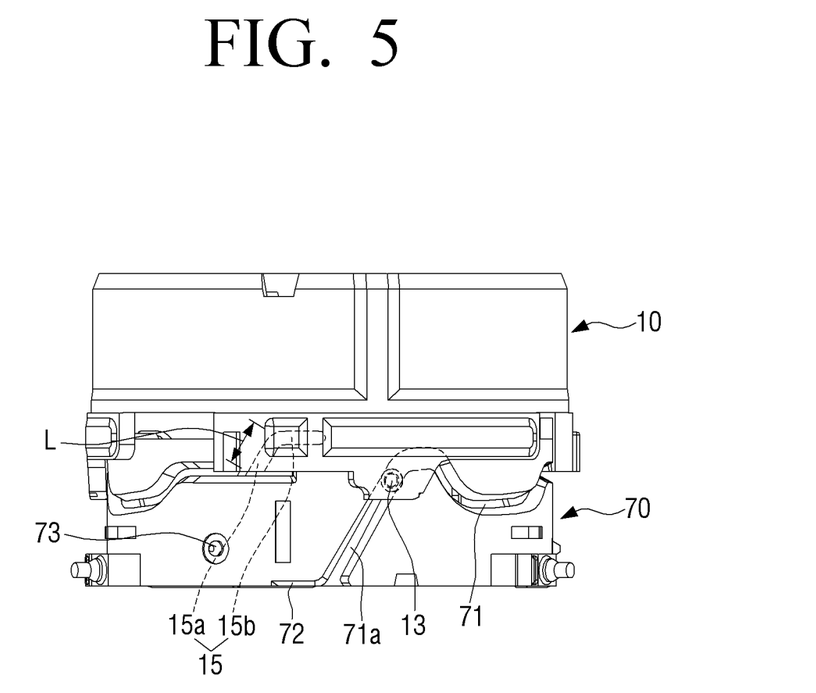
FIGS. 5 to 8 are schematic diagrams sequentially illustrating positions of a first cam projection of a first zoom ring and an auxiliary cam projection of a first guide ring when the first zoom ring is moved backward by the first guide ring, according to an exemplary embodiment.
Figure 6:
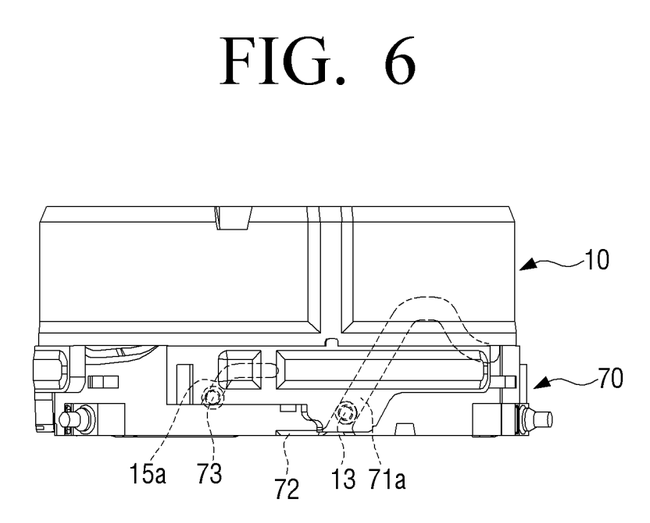

As illustrated in FIG. 5, when the first guide ring 70 is rotated to a state in which the first zoom ring 10 protrudes from the first guide ring 70 to the forefront, the first cam projection 13 of the first zoom ring 10 moves downward along the inclined portion 71a of the first cam groove 71 formed in the outer circumferential surface of the first guide ring 70. Subsequently, as illustrated in FIG. 6, when the first cam projection 13 reaches a position adjacent to the end (that is, a boundary between the inclined portion 71a and an end projecting portion 72 of the inclined portion 71a, which is a position just before the first cam projection 13 is deviated from the inclined portion 71a), the auxiliary cam projection 73 of the first guide ring 70 is inserted into the inclined portion 15a of the auxiliary cam groove 15 formed in the inner circumferential surface of the first zoom ring 10, such that a starting position of the auxiliary cam projection 73 of the first guide ring 70 corresponds to an ending position of the first cam projection 13. In this case, the auxiliary cam projection 73 of the first guide ring 70 may be configured such that the auxiliary cam projection 73 of the first guide ring 70 is inserted into the inclined portion 15a of the auxiliary cam groove 15 of the first zoom ring 10 while the first cam projection 13 is deviated from the first inclined portion 71a, thus the starting position of the auxiliary cam projection 73 simultaneously corresponds to the ending position of the first cam projection 13.

Figure 7:
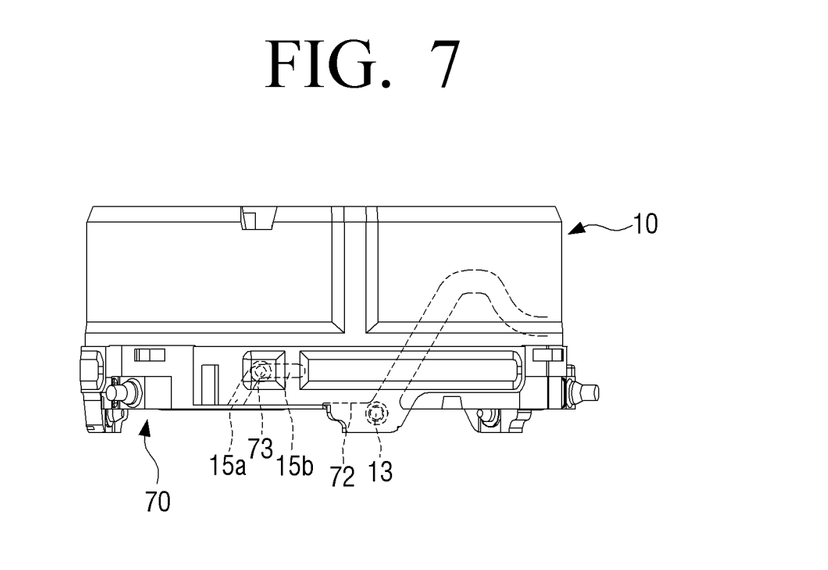

Next, when the first guide ring 70 is rotated, the first zoom ring 10 moves to a storage position. At this time, as illustrated in FIG. 7, the first cam projection 13 has deviated from the inclined portion 71a of the first cam groove 71, and the auxiliary cam projection 73 is introduced into the straight portion 15b extending from an end of the inclined portion 15a of the auxiliary cam groove 15. Subsequently, as illustrated in FIG. 8, the first cam projection 13 and the auxiliary cam projection 73 move slidably along the end projecting portion 72 formed in the one side end 70a of the first guide ring 70 and the straight portion 15b of the auxiliary cam groove 15, respectively.

As described above, in the exemplary embodiment, even when the first cam projection 13 has completely deviated from the inclined portion 71a of the first cam groove 71, since the auxiliary cam projection 73 is coupled to the auxiliary cam groove 15 and maintains the position of the first zoom ring 10, unwanted movement such as shaking between the first zoom ring 10 and the first guide ring 70 does not occur.

Figure 8:
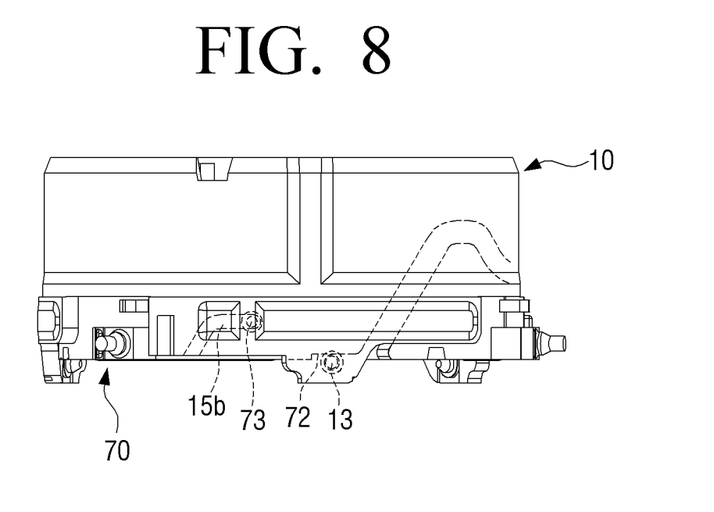
Figure 9:
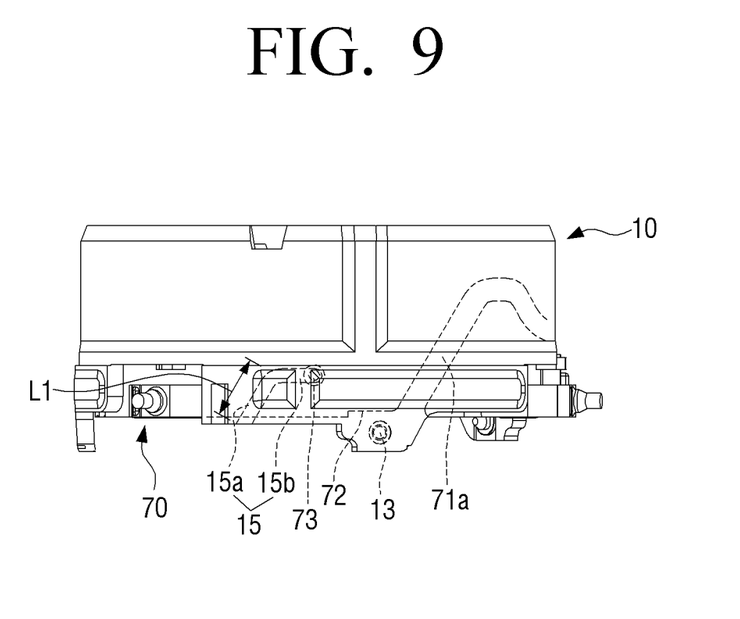
FIG. 9 is a schematic diagram illustrating an example in which a length of an inclined portion of an auxiliary cam groove is different from a length of an inclined portion as illustrated in FIG. 5.

Further, FIG. 8 illustrates that the first cam projection 13 is positioned to be in contact with the end projecting portion 72 formed on the one side end 70a of the first guide ring 70 and is positioned to support the first guide ring 70. However, in the exemplary embodiment, as illustrated in FIG. 9, even when the first cam projection 13 moves to a lower portion to be spaced apart from the one side end 70a of the first guide ring 70, since the auxiliary cam projection 73 has been inserted into the auxiliary cam groove 15, unwanted movement between the first zoom ring 10 and the first guide ring 70 does not occur. In this case, the auxiliary cam groove 15 may be implemented such that the inclined portion 15a is formed so that a length L1 of the inclined portion 15a is greater than the length L of the inclined portion 15a as illustrated in FIG. 5. The inclined portion 15a may be formed so that the length L1 of the inclined portion 15a may be greater than that of the straight portion 15b. As described above, the storage position of the first zoom ring 10 may be determined based on the length of the inclined portion 15a. Therefore, as the length of the inclined portion 15a is set to be long, the total full storage length of the zoom lens barrel assembly 1 can be reduced.

Further, in the exemplary embodiment, when the first cam projection 13, which has completely deviate from the first cam groove 71, is reinserted into the inclined portion 71a of the first cam groove 71, since the first cam projection 13 is guided by the auxiliary cam projection 73 moving along the auxiliary cam groove 15, a separate guide structure according to the related art which protrudes on the outer side of the first cam groove 71 to guide the first cam projection 13 can be omitted. Therefore, collision between the first cam projection 13 and the separate guide structure of the first cam groove 71 can be avoided to reduce an operation load and swing, and noise caused by the collision is basically suppressed to ensure operation reliability.

Figure 10:
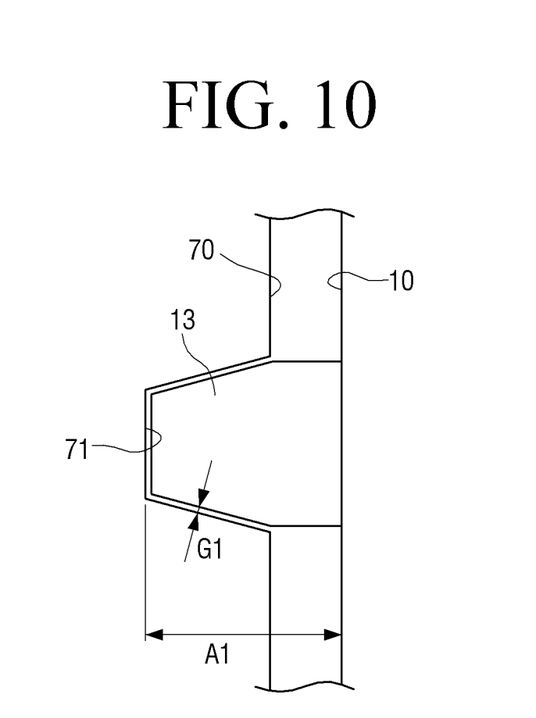
FIGS. 10 and 11 are schematic diagrams illustrating examples in which projecting lengths of a first cam projection of a first zoom ring are set to be different from each other.
Figure 11:
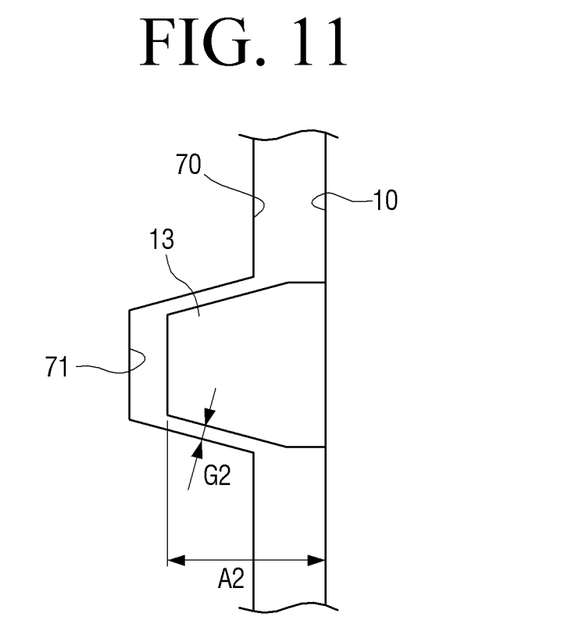

The first cam projection 13 may set a projecting length to appropriately control a combination relationship between the first zoom ring 10 and the first guide ring 70. FIGS. 10 and 11 are schematic diagrams illustrating examples in which the projecting lengths of the first cam projection 13 of the first zoom ring 10 are set to be different.

As illustrated in FIG. 10, a first projecting length A1 of the first cam projection 13 from the inner circumferential surface of the first zoom ring 10 is set so that the first cam projection 13 is mostly inserted into the first cam groove 7. The first cam groove 71 may have a first marginal gap G1 between the first cam projection 13 and the first cam groove 71, which can change based on a movement of the first cam projection 13. Further, as illustrated in FIG. 11, the first cam projection 13 is set to have a second projecting length A2 that is shorter than the first projecting length A1, and the marginal gap between the first cam projection 13 and the first cam groove 71 is a second marginal gap G2 that is larger than the first marginal gap G1.

Therefore, when the first cam projection 13 is set to the second projecting length A2, the first zoom ring 10 and the first guide ring 70 are a little loosely combined as compared when the first cam projection 13 is set to the first projecting length A1. Although the example in which the length of the first cam projection 13 is controlled has been illustrated in FIGS. 10 and 11, it is not limited thereto. A projecting length of the auxiliary cam projection 73 may be controlled, and the projecting lengths of the cam projections formed in the respective parts of the above-described zoom lens barrel assembly 1 may also be appropriately controlled and then used.

As described above, the projecting length of the cam projection is controlled according to manufacturing conditions of the respective parts of the zoom lens barrel assembly 1 so that rotation or linear movement between the parts may be smoothly performed.

Figure 12:
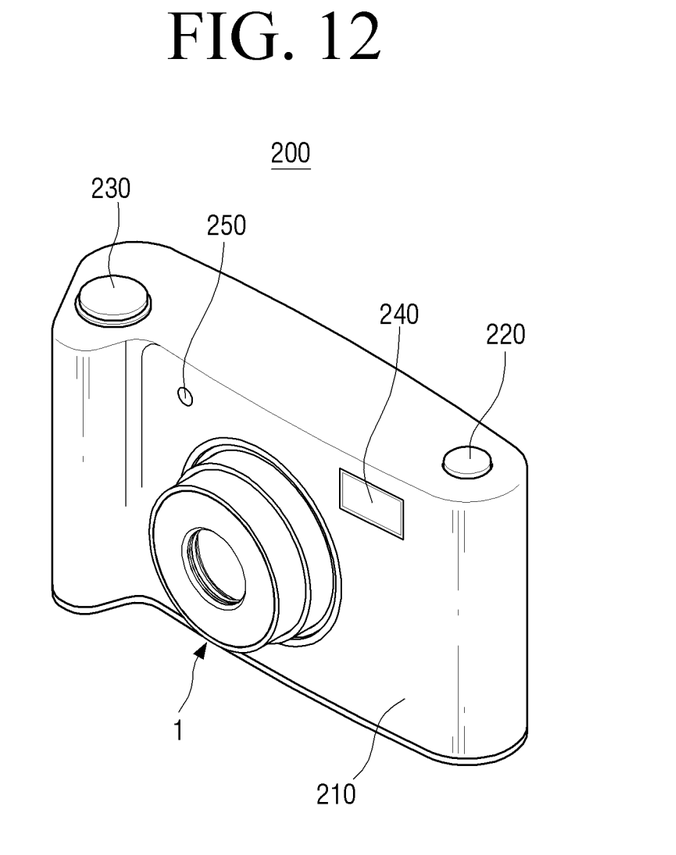
FIG. 12 is a perspective view illustrating an image capturing apparatus including a zoom lens barrel assembly, according to an exemplary embodiment.

FIG. 12 is a perspective view illustrating an image capturing apparatus 200 including the zoom lens barrel assembly 1, according to an exemplary embodiment.

Referring to FIG. 12, in a digital camera is shown as the image capturing apparatus 200 according to an exemplary embodiment. A power switch 220 is disposed on one side of a top of a camera body 210, and a shutter release button 230 is disposed on the other side of the top thereof. Further, a flash 240 and a flash-light intensity sensor 250 are disposed in an upper side of a front of the camera body 210, and a zoomable lens unit 1 is disposed in the center of the front thereof. A view-finder (not shown) may be included in a rear of the camera body 210 and in this case, the view-finder may be a flip type and may be connected to the camera body 210.

Further, a self-timer lamp (not shown) may be included on the camera body 210. In a self-timer mode, the self-timer lamp operates for a preset period of time from a point of time when the shutter release button 230 is pressed to a point of time when the capturing of an image starts. The flash-light intensity sensor 250 senses a light intensity and inputs the sensed light intensity to a digital camera processor (not shown) through a microcontroller (not shown) when the flash 240 operates.

The foregoing exemplary embodiments and advantages are merely exemplary and are not to be construed as limiting the present inventive concept. The exemplary embodiments can be readily applied to other types of devices. Also, the description of the exemplary embodiments is intended to be illustrative, and not to limit the scope of the claims, and many alternatives, modifications, and variations will be apparent to those skilled in the art.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention. In the description of the embodiments, certain detailed explanations of related art are omitted when it is deemed that they may unnecessarily obscure the essence of the invention.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

What is claimed is:

1. A zoom lens barrel assembly, comprising:
    a first zoom ring configured to support a first lens group;
    a first guide ring, on an outer side of which the first zoom ring is disposed, cam-connected to the first zoom ring to cause the first lens group to move linearly along an optical axis direction by rotation;
    a second zoom ring configured to support a second lens group and cam-connected to the first guide ring to move linearly along the optical axis direction;
    a second guide ring cam-connected to the first guide ring and configured to move linearly along the optical axis direction to rotate the first guide ring;
    a cylinder configured to move linearly along the optical axis direction together with the second zoom ring while being rotated; and
    an external cylinder comprising a third lens group, wherein the third lens group is positioned on an inner side of the external cylinder and on an optical axis together with the first and second lens groups, and the external cylinder is cam-connected to the cylinder to cause the cylinder to rotate,
    wherein an auxiliary cam projection of the first guide ring coupled to an auxiliary cam groove of the first zoom ring is inserted into the auxiliary cam groove of the first zoom ring, before a cam projection of the first zoom ring coupled to a cam groove of the first guide ring is deviated from the cam groove.

2. The zoom lens barrel assembly as claimed in claim 1, wherein the auxiliary cam groove comprises:
    an inclined portion obliquely formed from one side end of the first zoom ring toward another side end of the first zoom ring; and
    a straight portion formed along a circumferential direction of the first zoom ring from an end of the inclined portion.

3. The zoom lens barrel assembly as claimed in claim 2, wherein the auxiliary cam projection of the first guide ring is positioned on the inclined portion of the auxiliary cam groove when the cam projection of the first zoom ring is in a position adjacent to an end of the cam groove, before the cam projection of the first zoom ring is deviated from the cam groove.

4. The zoom lens barrel assembly as claimed in claim 2, wherein the auxiliary cam projection of the first guide ring is positioned on the inclined portion or the straight portion of the auxiliary cam groove, when the cam projection of the first zoom ring has deviated from the cam groove and is positioned to be in contact with one side end of the first guide ring.

5. The zoom lens barrel assembly as claimed in claim 2, wherein the auxiliary cam projection of the first guide ring is positioned on the inclined portion or the straight portion of the auxiliary cam groove, when the cam projection of the first zoom ring has deviated from the cam groove and is positioned to be spaced apart from one side end of the first guide ring.

6. The zoom lens barrel assembly as claimed in claim 2, wherein the inclined portion has a length greater than a length of the straight portion.

7. The zoom lens barrel assembly as claimed in claim 1, wherein the cam projection of the first zoom ring sets a marginal gap between the cam projection and the cam groove of the first guide ring according to a projecting length of the cam projection.

8. The zoom lens barrel assembly as claimed in claim 1, wherein the auxiliary cam projection of the first guide ring sets a marginal gap between the auxiliary cam projection and the auxiliary cam groove of the first zoom ring according to a projecting length of the auxiliary cam projection.

9. The zoom lens barrel assembly as claimed in claim 1, wherein the cam projection of the first zoom ring is formed on an inner circumferential surface of an extending portion, and the extending portion is formed on one side end of the first zoom ring to protrude along the optical axis direction.

10. A zoom lens barrel assembly, comprising:
    a first zoom ring configured to support a first lens group;
    a first guide ring, on an outer side of which the first zoom ring is disposed, cam-connected to the first zoom ring to cause the first lens group to move linearly along an optical axis direction by rotation;
    a second zoom ring configured to support a second lens group, disposed on an inner side of the first zoom ring, and cam-connected to the first guide ring to move linearly along the optical axis direction;
    a second guide ring, on an inner side of which the first guide ring is disposed, cam-connected to the first guide ring and configured to move linearly along the optical axis direction to rotate the first guide ring;
    a cylinder, on an inner side of which the second zoom ring is disposed, configured to move linearly along the optical axis direction together with the second zoom ring while being rotated; and an external cylinder, on an inner side of which the second is rotatably disposed, comprising a third lens group disposed on an optical axis together with the first and second lens groups, wherein a cam projection protruding on an inner side of the first zoom ring is slidably coupled to a cam groove formed in an outer side of the first guide ring, and an auxiliary cam projection on an outer side of the first guide ring is slidably coupled to an auxiliary cam groove formed on an inner side of the first zoom ring.

11. The zoom lens barrel assembly as claimed in claim 10, wherein the auxiliary cam projection of the first guide ring is inserted into the auxiliary cam groove of the first zoom ring, before the cam projection of the first zoom ring is deviated from the cam groove.

12. The zoom lens barrel assembly as claimed in claim 10, wherein the auxiliary cam projection of the first guide ring is inserted into the auxiliary cam groove of the first zoom ring simultaneously as the cam projection of the first zoom ring is deviated from the cam groove.

13. The zoom lens barrel assembly as claimed in claim 10, wherein the cam projection of the first zoom ring sets a marginal gap between the cam projection and the cam groove of the first guide ring according to a projecting length of the cam projection.

14. The zoom lens barrel assembly as claimed in claim 10, wherein the auxiliary cam projection of the first guide ring sets a marginal gap between the auxiliary cam projection and the auxiliary cam groove of the first zoom ring according to a projecting length of the auxiliary cam projection.

15. A capturing apparatus, comprising:
a camera body; and
a zoom lens barrel assembly installed in the camera body, wherein the zoom lens barrel assembly comprises:
a first zoom ring configured to support a first lens group;
a first guide ring, on an outer side of which the first zoom ring is disposed, cam-connected to the first zoom ring to cause the first lens group to move linearly along an optical axis direction by rotation;
a second zoom ring configured to support a second lens group and cam-connected to the first guide ring to move linearly along the optical axis direction;
a second guide ring cam-connected to the first guide ring and configured to move linearly along the optical axis direction to rotate the first guide ring;
a cylinder configured to move linearly along the optical axis direction together with the second zoom ring while being rotated; and
an external cylinder comprising a third lens group, wherein the third lens group is positioned on an inner side of the external cylinder and on an optical axis together with the first and second lens groups, and the external cylinder is cam-connected to the cylinder to cause the cylinder to rotate, wherein an auxiliary cam projection of the first guide ring coupled to an auxiliary cam groove of the first zoom ring is inserted into the auxiliary cam groove of the first zoom ring, before a cam projection of the first zoom ring coupled to a cam groove of the first guide ring is deviated from the cam groove.

* * * * *